United States Patent [19]

Wentzell

[11] Patent Number: 4,481,814
[45] Date of Patent: Nov. 13, 1984

[54] STUD INSPECTION SYSTEM

[75] Inventor: Timothy H. Wentzell, South Windsor, Conn.

[73] Assignee: Combustion Engineering, Inc., Windsor, Conn.

[21] Appl. No.: 392,844

[22] Filed: Jun. 28, 1982

[51] Int. Cl.³ .......................................... G01D 21/02
[52] U.S. Cl. .............................. 73/432 R; 33/178 E
[58] Field of Search ............... 73/432 B, 168, 432 R; 33/178 E, 178 F, 178 R, 302; 376/249, 258

[56] References Cited

U.S. PATENT DOCUMENTS 2,659,157 11/1953 Allen .................................. 33/178 R
3,614,891 10/1971 Nolte ..................................... 73/151
4,021,925 5/1977 Loftus ............................... 33/178 E
4,081,325 3/1978 Aubert et al. ......................... 376/249

Primary Examiner—S. Clement Swisher
Assistant Examiner—Tom Noland
Attorney, Agent, or Firm—Arthur L. Wade

[57] ABSTRACT

An elongated stud has an axial bore down which an inspection probe is rotated and translated on the end of a shaft which is moved through gearing with a pair of motors. Encoders on the motors coordinate the signal from the probe at a single station which manifests the sensed conditions of the stud at positions within the bore.

8 Claims, 3 Drawing Figures

4,481,814

STUD INSPECTION SYSTEM

TECHNICAL FIELD

The present invention relates to the inspection of studs to determine their volumes and wastage. More particularly, the invention relates to the manipulation of a detector for a stud by causing the detector to longitudinally translate a predetermined length of the bore of the stud and rotate it at predetermined positions within the bore. More particularly, the invention relates to a matrix of gearing between two motors and a shaft through which an inspection probe, mounted on the shaft, is moved longitudinally and/or rotated within a bore for inspection of its stud.

BACKGROUND ART

One of the inspections required in nuclear power installations is the volumetric and wastage status of studs of reactor coolant pumps. The primary element carried down the bore of each of these studs is a transducer which must be moved along the length of the bore and rotated at predetermined positions in the translation.

The developed primary element is mounted on a shaft and the shaft is reciprocated the length of the stud bore and rotated. While mounted on the shaft, a transducer is electrically connected to manifesting equipment external to the bore to record the volume and wastage information of the stud. A high degree of precision is required to coordinate the physical location of the transducer within the bore to the signal received by the transducer and transmitted through its electrical connection to the manifesting structure. An encoder must be provided, as well as a connection between a motive means, which will translate the rotation of the motive means into linear movement of the primary element and its rotation. It has been the practice to manually control the shaft and transducer position within bores. The automation of transition and rotation is required to reduce the time of inspection and to provide a more accurate record.

DISCLOSURE OF THE INVENTION

The present invention contemplates a matrix of gearing formed on the external surface of a longitudinal structure or shaft which can be simultaneously engaged by separately powered gears. The gearing is formed on the shaft to be continuously engaged by both powered gears and the shaft translated along its axis, or rotated about its axis, through the separate actuation of the motors.

The invention further contemplates encoders actuated by each motor for separate manifestation of the position of the shaft in translation and the position of the shaft in rotation.

The invention further contemplates a probe connected to the translated and rotated shaft communicated to signaling equipment external the bore, such signal equipment also connected to the encoders to manifest the location of probe-detected conditions of the stud.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Nomenclature

Figure 1:
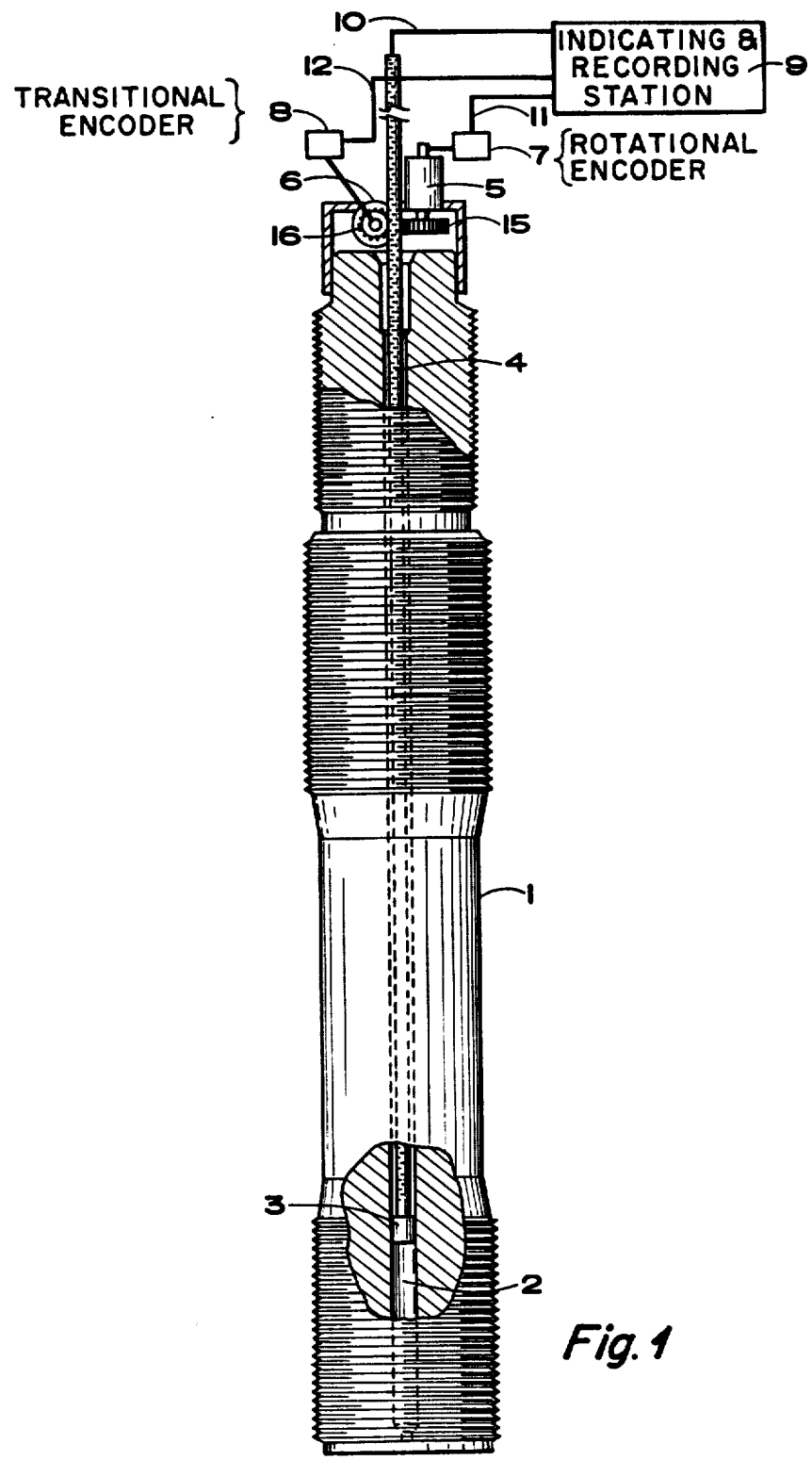
FIG. 1 is a sectioned elevation of a bored stud with an inspection probe being positioned in the bore through gearing with motive means, embodying the present invention.
Figure 3:
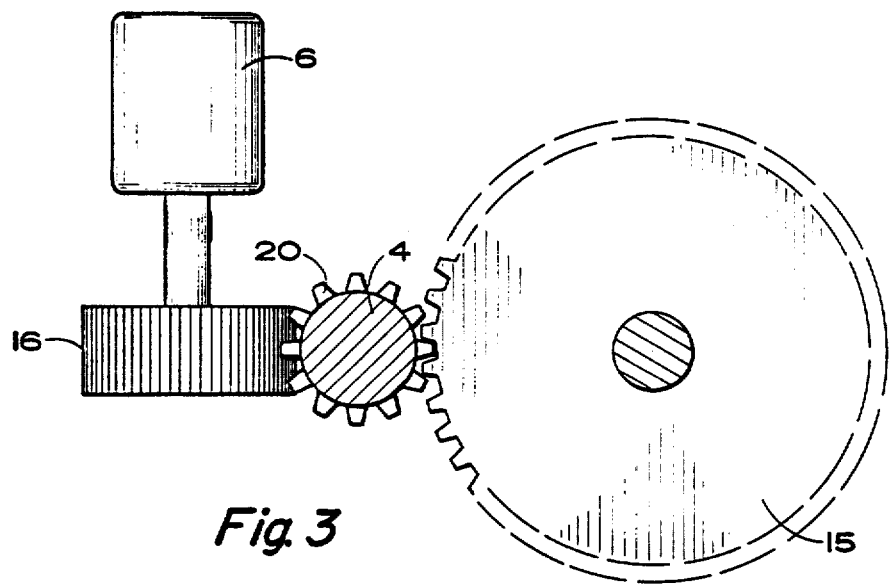
FIG. 3 is a plan view of FIG. 2 along lines 3—3.

In FIG. 1, a stud 1 is shown in sectioned elevation to have an axial bore 2 the length of the stud. A transducer, probe, or primary element 3 is mounted on the lower end of an elongated structure, or shaft, 4 and positioned in bore 2. A first motor 5 is engaged with shaft 4 to rotate shaft 4, and a second motor 6 (see FIG. 3) is simultaneously engaged with shaft 4 to reciprocate shaft 4 within bore 2. A rotational encoder 7 is connected to the first motor 5 to detect the rotational position of shaft 4. A transitional encoder 8 is connected to the second motor 6 to detect the axial position of shaft 4. A central indicating and recording station 9 is connected to the probe 3, and encoders 7 and 8 to mainfest the location and nature of conditions of the stud 1 as detected from within its bore 2.

Positional and Functional Relationships

The complete apparatus in which the invention is embodied is referred to as an inspection, or interrogation system. In the preferred embodiment, stud 1 represents any number of similar structures having bores from which stud information is required in rapid succession. FIG. 1 does not purport to hint at the nature of the mechanism transporting the inspection apparatus to the bore of stud 1. Stud 1 is simply delineated as in situ, vertically oriented with its bore 2 open from above to receive the primary element 3 down its length.

The basic function of the inspection/interrogation system is to position primary element 3 within bore 2 and rotate the element as required to pick up its information. The necessary electrical connection between the primary element and signaling structure 9 is represented by cable 10. It is not necessary to indicate the proximity of the signaling apparatus 9 to the primary element 3. Actually, they could be remotely spaced from each other.

Further, the present disclosure does not expend space or description on how the two motors 5 and 6, along with their encoders 7 and 8, are mounted above the upper end of stud 1. Such mounting structure is of plebian concern, and not necessary to the disclosure of the invention. Correspondingly, cables 11 and 12, from the encoders, indicate a connection from the encoders to the signal apparatus at 9 as necessary to blend their positional information with the condition information from the primary element to meet the requirements of locating detected conditions.

Finally, the actual reduction to practice has utilized an ultra-sonic detector as the primary element. Further, the bore has been filled with liquid into which the primary element has been received. These details of the actual reduction to practice are passed over by simply referring to the probe as a detector of "conditions"

which are obtained as the primary element is positioned within the bore of the stud.

The disclosure moves close to the essential elements of the invention in depicting a gear 15 rotated by first motor 5, and a gear 16 rotated by second motor 6. Both gear 15 and gear 16 are simultaneously engaged with shaft 4. Gear 15 is engaged with shaft 4 so that its motor can rotate shaft 4 as desired. At the same time, gear 16 is engaged with shaft 4 so that its motor can reciprocate shaft 4 as desired. Of course, the end result is to move primary element, probe, or transducer 3 on the lower end of shaft 4 in order for the sensing element to do its work in sending a signal back to station 9 and joining the signals from encoders 7 and 8 to form a composite manifestation of the location of the conditions sensed.

The control systems for motors 5 and 6 are not shown in FIG. 1 to maintain the elegance of simplicity. The motors are conventional mechanisms in their controls for rotating them first in one direction and then in the other direction, and are readily available and well-understood. The motors can be operated as rapidly as desired, with as much automation as desired, to carry probe 3 through its cycle of interrogation. It is easily visualized how the inspection apparatus can be carried to the studs in situ and the structure embodying the present invention applied to move the probe 3 down the stud bore to acquire the manifestation at station 9, followed by complete withdrawal of the probe 3 preparatory to moving to other studs. However, all this structure depends upon the gearing connection between shaft 4 and motor-powered gears 15 and 16.

Shaft 4 Teeth and Vertical and Horizontal Gears

Orienting the axes of gears 15 and 16 relative to the axis of shaft 4, gear 15 is in a horizontal plane, and gear 16 is in a vertical plane. Brought into mesh with gear teeth on the external surface of shaft 4, powered gear 15 rotates shaft 4, and powered gear 16 moves shaft 4 vertically. Under the concept of the present invention, the teeth of both gears 15 and 16 are held in permanent engagement with the teeth of shaft 4. Therefore, the arrangement of this bearing must provide for slippage of one gear relative to the shaft 4 teeth, while the other gear rotates, or reciprocates, the shaft.

The teeth of both gear 15 and gear 16 are of conventional form. That is, the teeth are parallel to the axis of their gears, the teeth of gear 15 extending vertically, and the teeth of gear 16 extending horizontally. Both sets of gear teeth engage teeth 20 on the external surface of shaft 4. However, the teeth of gear 15 engage teeth 20 horizontally, while the teeth of gear 16 engage shaft teeth 20 vertically.

Figure 2:
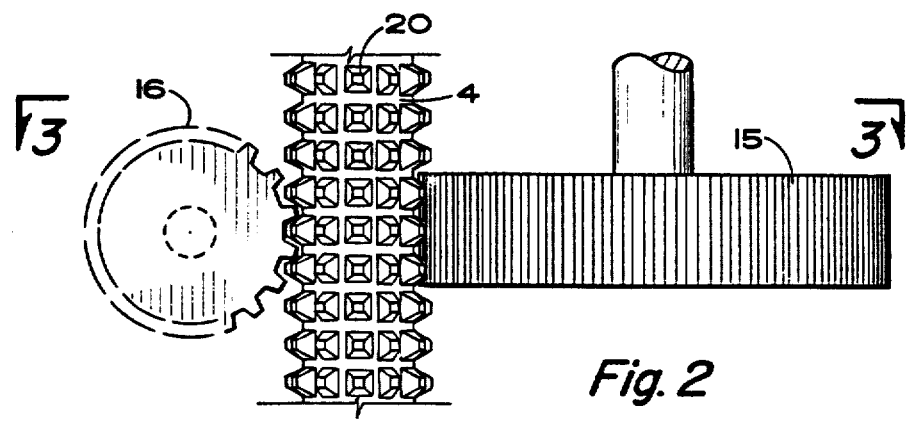
FIG. 2 is an enlarged elevation of the probe-bearing shaft of FIG. 1 engaged by the powered gears.

If teeth 20 were to engage only the teeth of gear 15, they would be in the form of splines along the external surface of shaft 4. If teeth 20 engaged only the teeth of gear 16, they would be in the form of horizontal rings evenly spaced along the length of shaft 4. However, in developing teeth 20 as a combination of both splines and rings, they emerge as an even pattern of truncated, four-sided pyramids, with their bases on the external surface of shaft 4. This pattern can be easily observed in FIG. 2. Further, FIG. 2 makes it evident that reciprocation of shaft 4 along its axis enables the teeth of gear 15 to slip down the vertical passages between teeth 20 as vertical rows. Alternatively, FIG. 2 makes it evident that when shaft 4 is rotated by horizontal engagement with the teeth of gear 15, the teeth of gear 16 will slip around the shaft in the passages of teeth 20 as circumferential rows on the external surface of shaft 4.

It is necessary to view the teeth 20 as in vertical rows, or in horizontal rings. In vertical rows, teeth 20 form the equivalent of a so-called rack engaged by the teeth of gear 16. Alternatively, teeth 20 are viewed as evenly spaced rings around shaft 4 to form a gear engaging the teeth of gear 15 for rotation of shaft 4. Thus, it becomes apparent that programed operation of the motors 5 and 6, through their gears 15 and 16, rotate and reciprocate shaft 4 to carry probe 3 in bore 2 to complete the mission of scanning the conditions of the stud from within its bore in order for them to be manifested at station 9.

Conclusion

In defining the invention under its concepts, the end result sought is described as the movement of a primary sensing element in a path. This path is disclosed in the drawings as being within a bore of a stud. However, the invention is not to be limited to detecting conditions of a stud from within its bore. The invention is in the arrangement of gearing through which two motive means alternatively reciprocate and rotate a shaft to which a sensing element is attached.

It is the gearing between the two motive means and the shaft which comprises the essential element of the invention. This gearing is embodied in teeth arranged in vertical rows and horizontal rings upon a cylindrical surface of the shaft where they can be engaged horizontally by a first gear and vertically by a second gear.

The gears are independently connected to and actuated by motors. Peripheral teeth on the gears mesh with the shaft teeth to enable the motors to reciprocate the shaft by vertical engagement between the teeth, and rotate the shaft by horizontal engagement between the teeth. The shaft teeth are considered in vertical, parallel rows as forming grooves between them, traveled by the rotation gear teeth as the shaft is reciprocated. Alternatively, the shaft teeth are considered as rings parallel to each other along the shaft to form passages between them, traveled by the reciprocating teeth when the shaft is rotated. Thus, with slippage between the gears as the shaft is reciprocated and rotated, the motors are effectively actuated alternatively to move the primary element on the end of the shaft in the path as required for sensing conditions along the path.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. In a system for positioning a sensing element within a bore and having a remote station at which the sensing element within the bore manifests the conditions sensed at specific locations within the bore, including, a shaft mounted to extend its lower end vertically down the bore whose body is to be inspected, a single set of gear teeth mounted on the external surface of the shaft through which both rotation and translation of the shaft is carried out, said sensing element comprising a transducer used as a probe mounted on the lower end of the shaft to sense body conditions, a first motor having a first gear mounted to horizontally engage the teeth on the external surface of the shaft for rotating the shaft, a second motor having a second gear mounted to vertically engage the teeth on the external surface of the shaft to translate the shaft axially, encoders connected to both motors to register the rotation of the motors as the position of the transducer within the bore, and the station connected to the transducer and encoders to manifest the location of conditions sensed by the transducer within the bore.

2. A system for positioning a primary element within a vertically oriented bore, including, an elongated shaft member arranged to extend its lower end into the bore, a primary element mounted on the lower end of the shaft member, teeth formed on the external cylindrical surface of the shaft member in the form of truncated pyramids with their bases mounted on the external surface and arranged in parallel vertical rows and parallel horizontal rows, a first gear mounted on an axis parallel with the shaft axis and its teeth on its periphery engaged with the teeth on the shaft so as to bear upon the shaft teeth horizontally, a first motor mounted to rotate the first gear for rotating the shaft to any predetermined position, a second gear mounted with its axis at right angles to the vertical axis of the shaft member and with its peripheral teeth engaged with the teeth on the external surface of the shaft member to bear upon the teeth of the shaft in vertical directions to position the shaft vertically, a second motor connected to the second gear to position the shaft vertically to predetermined positions, and a control station connected to the primary element on the end of the shaft to manifest conditions surrounding the bore to which the primary element responds at the positions predetermined by operation of the two motors.

3. The system of claim 2, including, a first encoder for the first motor, a second encoder for the second motor, and means connecting both encoders to the station in order to combine the output of the encoders with the primary element signal to manifest the bore location and conditions surrounding the bore sensed by the primary element.

4. The system of claim 3, in which, teeth on the external surface of the shaft are in the form of truncated four-sided pyramids based on the shaft surface and arranged to form parallel rows vertically and horizontally for engagement by the teeth of the two gears.

5. The system for reciprocating and rotating a primary sensing element, including, having the primary element be of a kind which detects a condition in an elongated path as the element is reciprocated along the path and rotated at predetermined positions in the path, a shaft attached to the primary element and extending axially along the path, a first set of gear teeth formed to protrude from a cylindrical surface on the shaft and arranged in vertical rows and horizontal rings, a first gear mounted such that its axis is parallel to the path, a second set of teeth mounted on the periphery of the first gear engaging the first set of teeth horizontally as the gear rotates, a second gear mounted with its axis spaced from the path and extending at right angles to the path, a third set of teeth mounted on the periphery of the second gear engaging the first set of teeth vertically as the gear rotates, and means rotating the gears separately and selectively to reciprocate the shaft along the path and rotate the shaft at any predetermined position in the path.

6. The system of claim 5, wherein, the parallel vertically extended teeth of the second set and the first set of teeth are arranged in vertical rows between which the teeth of the second set travel as the shaft is reciprocated.

7. The system of claim 5, wherein, the substantially horizontally extended teeth of the third set are arranged to travel between the horizontal rings of the first set when the shaft is rotated.

8. The system of claim 5, wherein, the first set of teeth are in the form of truncated four-sided pyramids with the base of each tooth mounted on the cylindrical surface of the shaft.

* * * * *